US010160300B2

(12) United States Patent
Burkhardt et al.

(10) Patent No.: US 10,160,300 B2
(45) Date of Patent: Dec. 25, 2018

(54) VEHICLE SOFT TOP SUPPORT BRACKET SYSTEM

(71) Applicants: Brice A Burkhardt, Lake Orion, MI (US); Jason E. Schultz, Clarkston, MI (US)

(72) Inventors: Brice A Burkhardt, Lake Orion, MI (US); Jason E. Schultz, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 24 days.

(21) Appl. No.: 15/364,703

(22) Filed: Nov. 30, 2016

(65) Prior Publication Data

US 2018/0147927 A1 May 31, 2018

(51) Int. Cl.
B60J 9/00 (2006.01)
B60J 7/12 (2006.01)
B60J 10/90 (2016.01)

(52) U.S. Cl.
CPC ............... B60J 9/00 (2013.01); B60J 7/1265 (2013.01); B60J 10/90 (2016.02)

(58) Field of Classification Search
CPC ............. B60J 10/90; B60J 7/1265; B60J 9/00
USPC ........................................................ 296/130
See application file for complete search history.

(56) References Cited

U.S. PATENT DOCUMENTS

| 5,992,917 | A | 11/1999 | Hilliard et al. | |
| 6,295,713 | B1 | 10/2001 | Hilliard et al. | |
| 7,278,677 | B2* | 10/2007 | Emerson | B60J 11/06 296/136.04 |
| 8,474,899 | B2 | 7/2013 | Moran et al. | |
| 2012/0286540 | A1 | 11/2012 | Moran et al. | |
| 2014/0339851 | A1* | 11/2014 | Bennett | B60J 7/1226 296/122 |

* cited by examiner

Primary Examiner — Joseph D. Pape
Assistant Examiner — Dana D Ivey
(74) Attorney, Agent, or Firm — Ralph E. Smith

(57) ABSTRACT

A support bracket assembly configured to couple to a vehicle body and support a collapsed articulating frame of a vehicle soft top assembly is provided. The support bracket assembly includes a support bracket having a main body portion having a slot formed therein and configured to couple to the vehicle body, and a receiving portion coupled to the main body portion and configured to receive at least a portion of the collapsed articulating frame therein. A strap is configured to be inserted through the slot and wrapped around the collapsed articulating frame to facilitate securing the collapsed articulating frame within the receiving portion and preventing relative movement of the collapsed articulating frame when the vehicle is in motion.

18 Claims, 5 Drawing Sheets

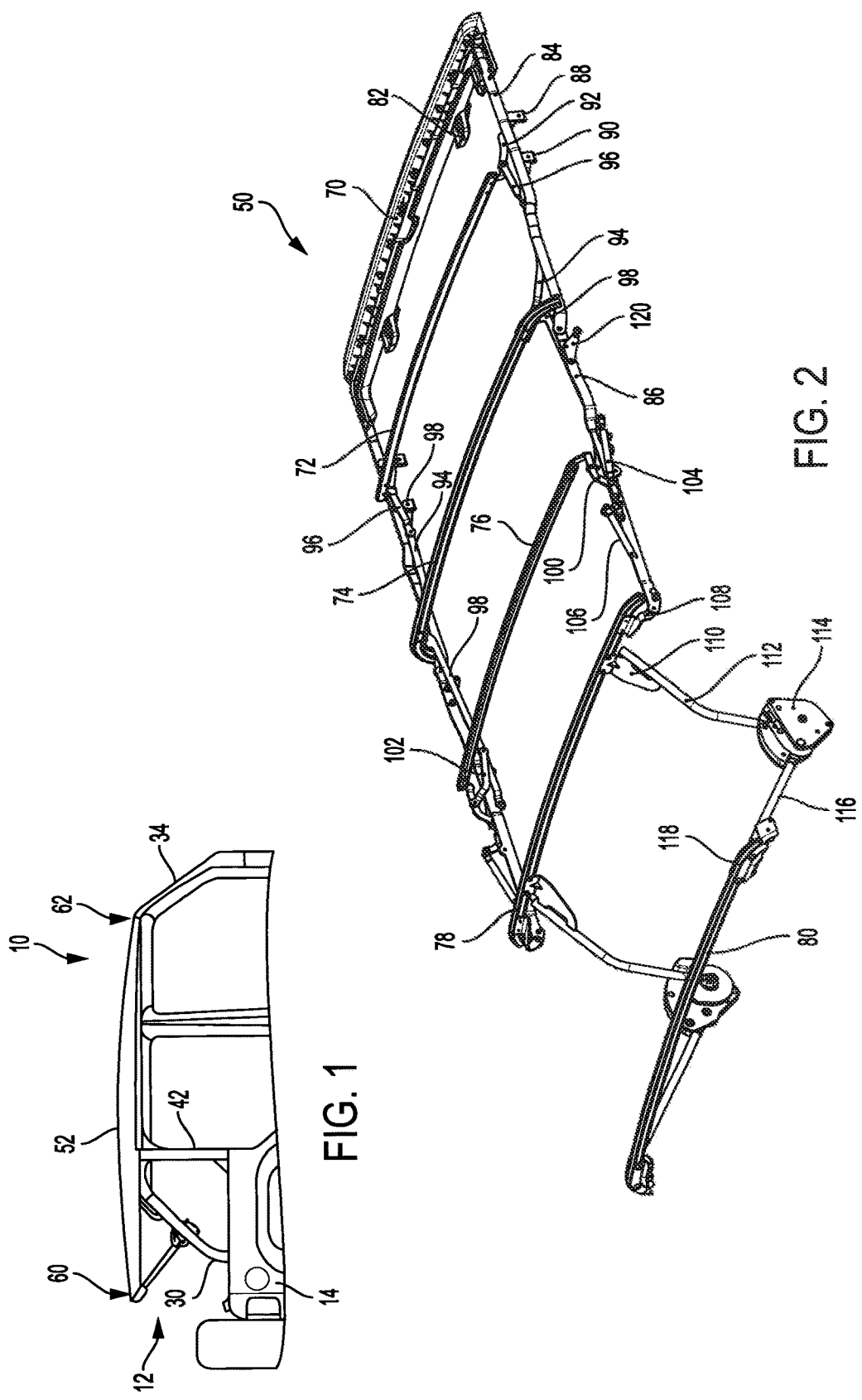

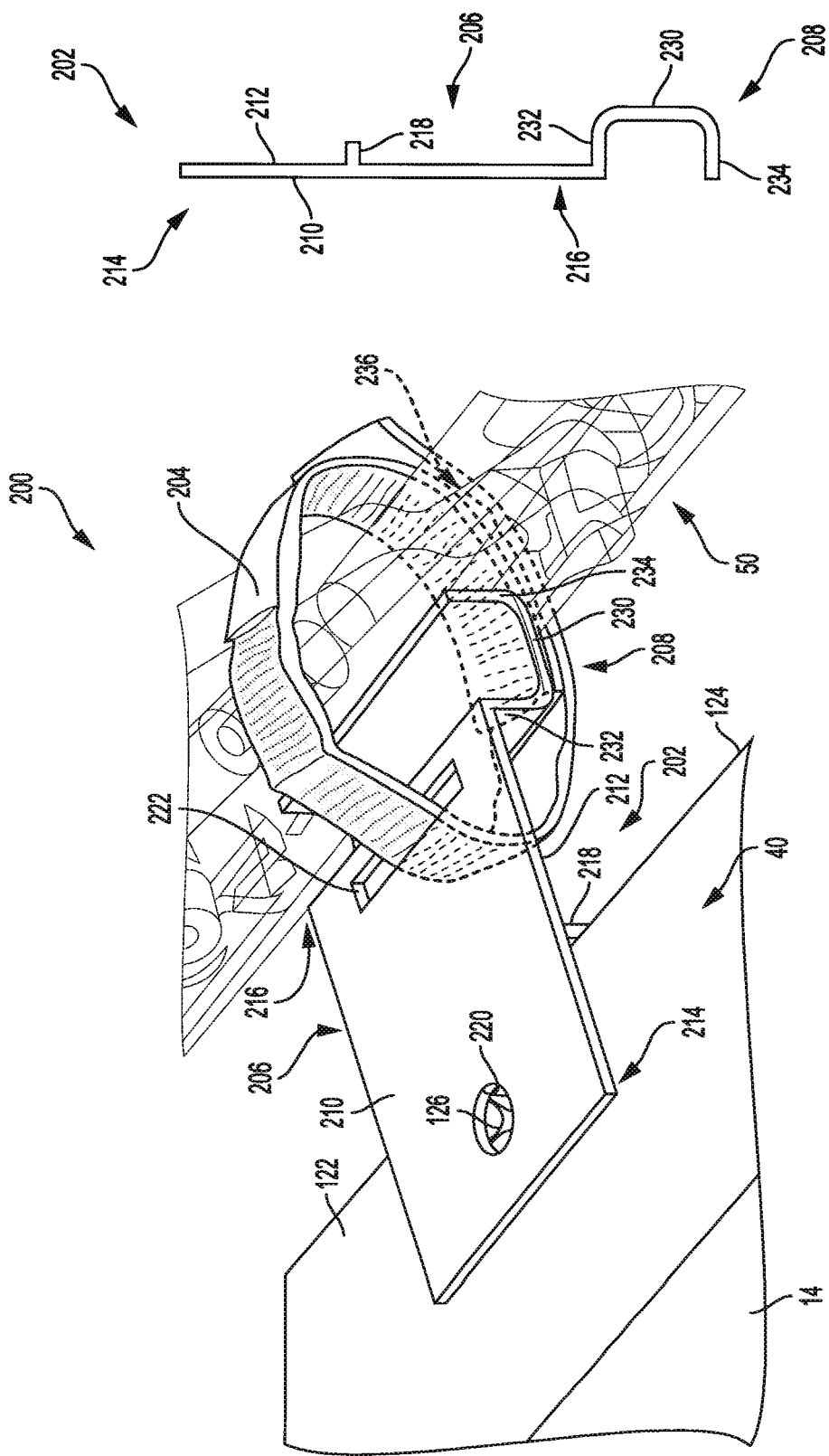

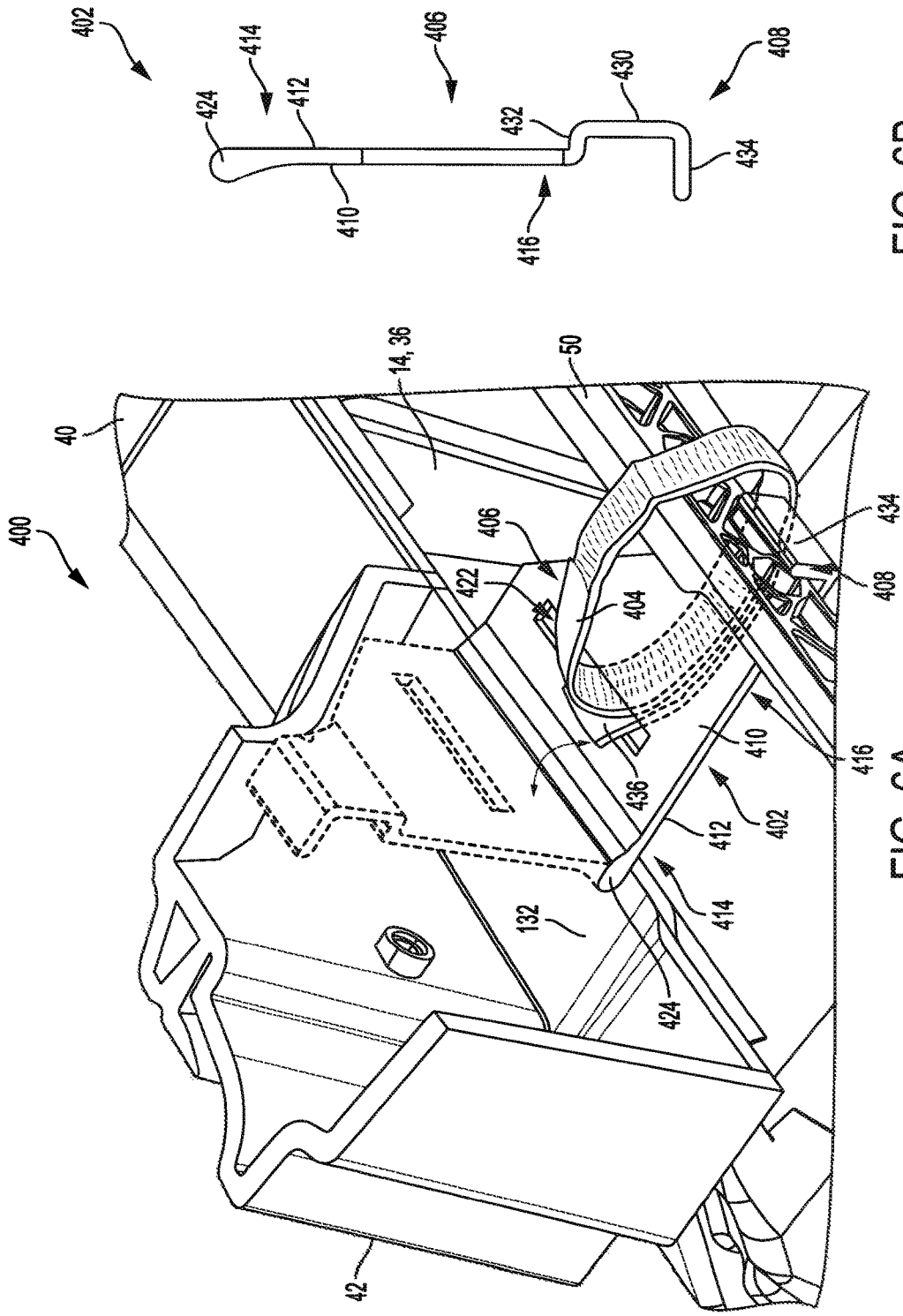

VEHICLE SOFT TOP SUPPORT BRACKET SYSTEM

FIELD

The present application relates generally to convertible top systems for a vehicle and, more particularly, to a support bracket system for a collapsible convertible soft top for a vehicle.

BACKGROUND

It is known in the motor vehicle art to provide a convertible top, which may be folded back or removed from the vehicle. In one example, the convertible top is constructed of a flexible fabric (referred to as a soft top) and is folded back to a storage position or otherwise removed from an installed position. Soft tops provide a user with the benefit of open air driving while affording available protection in the event of adverse weather conditions. Most known soft tops are designed to be easily retracted to a stored position, either under a source of power or manually. However, driving while the soft top is in the retracted and stored position may cause linkages of the soft top to contact show surfaces of the vehicle and potentially cause unnecessary wear or noise. Accordingly, while known soft top systems work well for their intended purpose, it is desirable to provide an improved vehicle soft top system.

SUMMARY

In accordance with an exemplary aspect of the invention, a support bracket assembly configured to couple to a vehicle body and support a collapsed articulating frame of a vehicle soft top assembly is provided. In one exemplary implementation, the support bracket assembly includes a support bracket having a main body portion having a slot formed therein and configured to couple to the vehicle body, and a receiving portion coupled to the main body portion and configured to receive at least a portion of the collapsed articulating frame therein. A strap is configured to be inserted through the slot and wrapped around the collapsed articulating frame to facilitate securing the collapsed articulating frame within the receiving portion and preventing relative movement of the collapsed articulating frame when the vehicle is in motion.

In accordance with another exemplary aspect of the invention, a vehicle is provided. In one exemplary implementation, the vehicle includes: a vehicle body including opposed rear side panels having an upper surface; a soft top assembly coupled to the vehicle body, the soft top assembly including an articulating frame movable between a deployed position and a collapsed stowed position; and a pair of support bracket assemblies coupled to the opposed rear side panel upper surfaces and configured to support the articulating frame in the collapsed position. Each support bracket assembly includes: a support bracket having a main body portion having a slot formed therein and configured to couple to one rear side panel, and a receiving portion coupled to the main body portion and configured to receive at least a portion of the collapsed articulating frame therein; and a strap configured to be inserted through the slot and wrapped around the collapsed articulating frame to facilitate securing the collapsed articulating frame within the receiving portion and preventing relative movement of the collapsed articulating frame when the vehicle is in motion.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a side view of a vehicle with an exemplary soft top assembly in an operative deployed position in accordance with the principles of the present disclosure;

FIG. 2 is a perspective view of an articulating frame of the soft top assembly shown in FIG. 1 in accordance with the principles of the present disclosure;

FIG. 4a is a perspective view of an example support bracket configured to support the soft top assembly in the position shown in FIG. 3, in accordance with the principles of the present disclosure;

FIG. 4b is a side view of the support bracket shown in FIG. 4a, in accordance with the principles of the present disclosure;

FIG. 6a is a perspective view of yet another example support bracket configured to support the soft top assembly in the position shown in FIG. 3, in accordance with the principles of the present disclosure; and FIG. 6b is a side view of the support bracket shown in FIG. 6a, in accordance with the principles of the present disclosure.

DESCRIPTION

Figure 3:
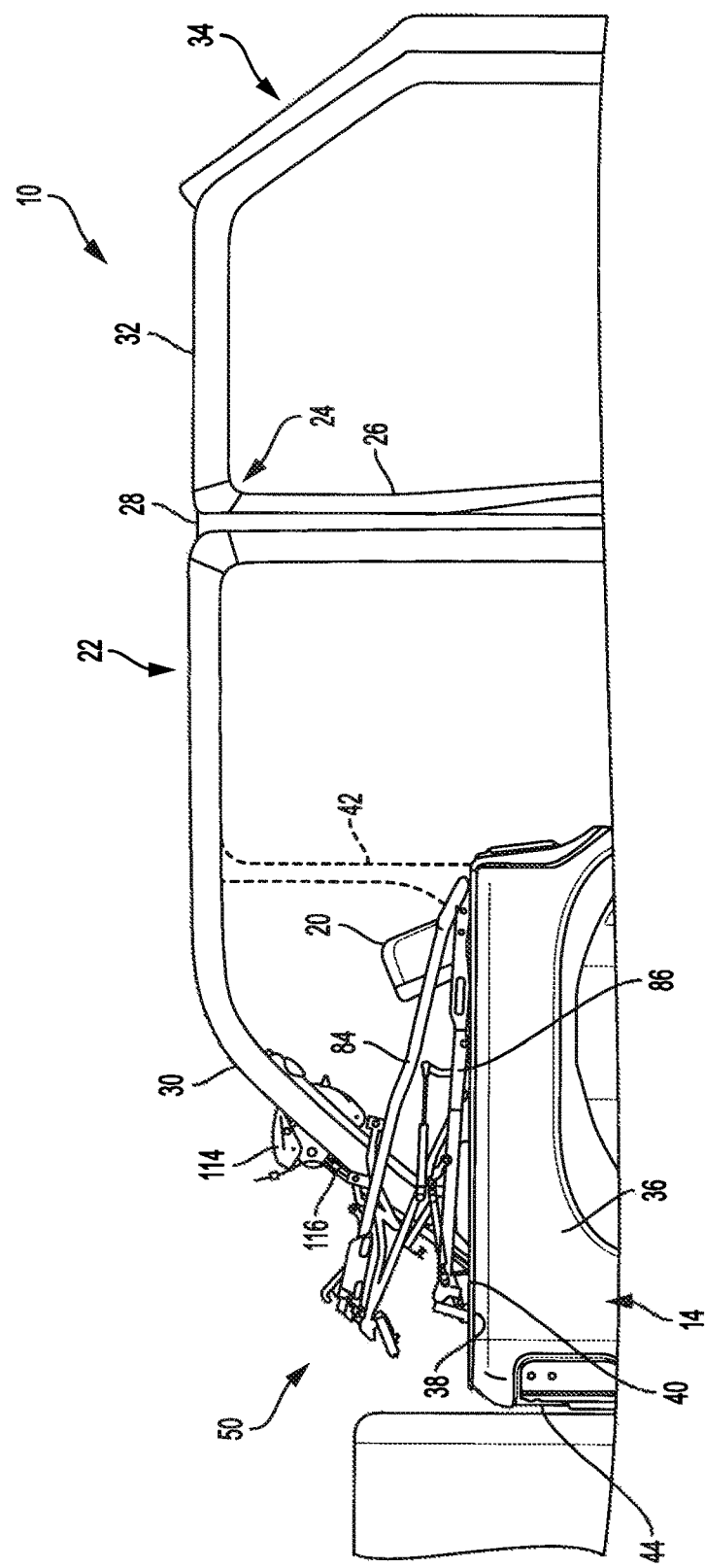
FIG. 3 is a side view of the articulating frame of FIG. 2 shown in a retracted position on the vehicle, in accordance with the principles of the present disclosure.

With initial reference to FIGS. 1-3, an exemplary soft top assembly for a vehicle 10 is shown and generally identified at reference numeral 12. FIGS. 1 and 2 illustrate soft top assembly 12 in a deployed position to protect passengers in the vehicle interior from weather conditions such as wind, rain, or snow. The soft top assembly 12 can be articulated between its deployed position and a retracted position shown in FIG. 3. Moreover, soft top assembly 12 may have one or more intermediate positions to provide varying overhead exposure to the passengers in the vehicle interior.

In the example implementation shown in FIG. 3, the vehicle 10 generally includes a vehicle body 14, vehicle road wheels (not shown), front passenger seating (not shown), and rear passenger seating 20. A roll bar assembly 22 extends upwardly from the vehicle body 14 and includes a generally U-shaped main roll bar 24 formed by a pair of laterally spaced apart vertical members 26 (only one shown) interconnected by a transverse member 28. A pair of rear roll or sport bars 30 (only one shown) are coupled to the main roll bar 24 and extend rearward therefrom and downwardly to the vehicle body 14. A pair of side bars 32 (only one shown) are coupled to the main roll bar 24 and extend forwardly to a vehicle windshield assembly 34. Vehicle body 14 includes a pair of opposed rear side panels 36 having an upper surface 38 configured to receive a rear rail 40 and a door rail 42.

Although not shown, portions of the roll bar assembly 22 may be covered with a protective padding. Moreover, although the vehicle 10 and roll bar assembly 22 are illustrated in FIG. 2 as a four-door configuration, the vehicle may be arranged in other configurations such as a two-door configuration. It will be understood that the soft top assembly for the two-door configuration may include fewer or additional components, but is otherwise generally similar to the soft top assembly 12 described herein.

The illustrated soft top assembly 12 is coupled to the vehicle 10 and is configured articulate between the deployed position (FIG. 1) where it substantially covers the roll bar assembly 22 and the vehicle interior, and the stowed position where it is folded down upon itself and generally located at a rear of the vehicle 10 generally between rear seat 20 and a tailgate 44. In the stowed position, portions of the soft top assembly 12 are secured in place by a support bracket assembly 200, 300, 400, as described herein in more detail.

In the illustrated example shown in FIGS. 1 and 2, the soft top assembly 12 generally includes an articulating frame 50, a roof or main cover 52, a pair of removable quarter windows (not shown), a removable rear window (not shown), and door rails 42 (only one shown). The main cover 52 is coupled to and extends over the articulating frame 50. The main cover 52 includes a rear edge 60, and a forward edge 62 configured to releasably couple to the windshield assembly 34.

The quarter windows are configured to be removably coupled to the main cover 52, for example, by a zipper and/or other attachment feature (e.g., hook and pile, button snap, strap, etc.). The quarter windows are also configured to be removably coupled to the vehicle body rear rail 40 and the door rail 42. The rear window is configured to be removably coupled to the main cover 52, for example, by a zipper and/or other attachment feature (e.g., hook and pile, button snap, strap, etc.). The rear window is also removably coupled to the vehicle body rear rail 40 and the vehicle tailgate 44. The door rails 42 are configured to provide a sealing face for a vehicle door (not shown) and are coupled proximate to the vehicle body 14 and portions of the roll bar assembly 22 such as, for example, vertical member 26 and/or side bar 32.

As illustrated in FIG. 2, the articulating frame 50 generally includes a first or forward support member or bow 70, a second support member or bow 72, a third support member or bow 74, a fourth support member or bow 76, a fifth support member or bow 78, and a sixth or rearward support member or bow 80.

In the deployed position, intermediate second, third, fourth, a fifth bows 72, 74, 76, 78 extend transversely across the underside of the main cover 52 for supporting the fabric of the soft top main cover 52 in a cross-car direction. In the deployed position, the rearward bow 80 supports rear edge 60 of the main cover 52.

The forward bow 70 is configured to couple to the roll bar assembly 22 and/or windshield assembly 34 via a pair of brackets 82, and the forward edge 62 of the soft top main cover 52 is coupled to forward bow 70. A pair of front side rails 84 are coupled to forward bow 70 at one end and extend rearwardly therefrom. The other end of each front side rail 84 is pivotably coupled to a rear side rail 86. Front side rails 84 each include a bow pivot bracket 88 and a bow control bracket 90. Each end of the second bow 72 is pivotably coupled to bow pivot bracket 88 via a forward second bow pivot link 92, and pivotably coupled to a forward third bow link 94 via a rear second bow pivot link 96.

Each end of third bow 74 is pivotably coupled to one bow control bracket 90 via the forward third bow link 94, and pivotably coupled to rear side rail 86 via a rear third bow pivot link 98.

Each end of fourth bow 76 is pivotably coupled to one rear side rail 86 via a fourth bow pivot link 100, and a fourth bow control link 102 is pivotably coupled between the fourth bow pivot link 100 and rear third bow pivot link 98. A first pair of gas cylinder struts 104 and a second pair of gas cylinder struts 106 are operably associated with the articulating frame 50 to facilitate movement of frame 50 between the deployed and retracted positions.

Each end of fifth bow 78 is pivotably coupled to one rear side rail 86 via a rear pivot bracket 108. A pair of attachment brackets 110 is coupled to fifth bow 78 and a fifth bow pivot link 112 extends from each attachment bracket 110 at one end. The other end of fifth bow pivot link 112 is coupled to a lift assistance mechanism 114, which is coupled to sport bar 30.

Each end of the rear bow 80 is pivotably coupled to one lift assistance mechanism 114 via a sixth bow pivot link 116, and includes a rear attachment bracket 118 configured to couple to main cover rear edge 60.

When the soft top assembly 12 is articulated from its deployed position (FIG. 1) to the stowed position (FIG. 2), the forward side rails 84 fold rearward back on top of the rear side rails 86 and carry the forward bow 70 and intermediate bows 72, 74, 76 through corresponding pivoting arcs. Then the rear bow 80 is rotated downward about a transverse pivot axis of the lift assistance mechanisms 114, which draws or pulls the rear side rails 86 (along with front side rails 84 on top) rearward. The rear side rails 86 slide rearward on a pair of roller brackets 120 (FIG. 3) received in a track system (not shown) disposed in or on the roll bar assembly 22, and front/rear side rails 84, 86 are subsequently lowered onto the rear bow 80. The resulting collapsed articulating frame 50 is then lowered into a cavity located between the rear seat 20 and the tailgate 44 to the stowed position shown in FIG. 3.

In the stowed position, front/rear side rails 84, 86 are disposed outboard of sport bars 30, and pivot links 112, 116 are disposed inboard of sport bars 30. The soft top main cover 52 is folded backward upon itself and is attached to one or more of bows 70-80, to thereby form a minimally visible stack. A wrap or boot (not shown) may be used to gather loose fabric and retain the soft top assembly 12 in its collapsed, stowed position.

As noted above, in the collapsed and stowed position (FIG. 3), the folded front/rear side rails 84, 86 are supported and secured by one or more support bracket assembly 200, 300, 400 disposed on either side of the vehicle body rear side panels 36. As such, during motion of the vehicle, support brackets assemblies 200, 300, 400 reduce or prevent motion of side rails 84, 86 and reduce the risk of wear to vehicle interior trim and/or sport bars 30.

With further reference to FIGS. 4a and 4b, support bracket assembly 200 will be described in more detail. In the example embodiment, each support bracket assembly 200 generally includes a support bracket 202 and a strap 204. In general, one support bracket 202 is secured to the opposed rear rails 40 disposed on either side of the rear of the vehicle.

Thus, each support bracket 202 receives one side of the collapsed articulating frame 50 (e.g., front/rear side rails 84, 86), and straps 204 are utilized to subsequently secure frame 50 to the support brackets 202 to facilitate preventing relative movement between frame 50 and the vehicle body.

In the illustrated example, support bracket 202 generally includes a main body portion 206 and a receiving portion 208 extending therefrom. Main body portion 206 includes an upper face 210, a lower face 212, a first end 214, and an opposite second end 216. Lower face 212 includes an alignment flange 218 extending outwardly therefrom. As shown in FIG. 4a, at least portion of lower face 212 is configured to be disposed against an upper surface 122 of rear rail 40, and alignment flange 218 is configured to be disposed against a side surface 124 of rear rail 40. Main body portion first end 214 includes an aperture 220 formed therein configured to be aligned with an aperture 126 formed in rear rail 40. Apertures 220, 126 are configured to receive a fastener (not shown) such as a bolt to thereby removably couple support bracket 202 to the rear rail 40 and vehicle body 14. Main body portion second end 216 includes an aperture or slot 222 formed therein configured to receive strap 204 therethrough.

Support bracket receiving portion 208 is generally U-shaped and includes a supporting wall 230 extending between a first side wall 232 and a second side wall 234. First side wall 232 is coupled to main body portion 206 and opposite second side wall 234 is a free end. Supporting wall 230 provides a supporting surface for the articulating frame 50 in the stowed position (FIG. 3) and side walls 232, 234 are disposed on either side of the received articulating frame 50. In this way, supporting wall 230 facilitates preventing downward movement of frame 50, and side walls 232, 234 facilitate preventing transverse cross-car movement of frame 50.

Moreover, strap 204 is inserted through slot 222, wrapped around frame 50 and receiving portion 208, and tightened to further secure frame 50 within receiving portion 208. This facilitates preventing upward movement of frame 50 as well as fore/aft movement of frame 50. In the example embodiment, strap 204 includes a hook and pile fastener portion 236 such that strap 204 can be attached to itself after being inserted through slot 222 and tightened around frame 50 and receiving portion 208. However, it will be appreciated that strap 204 may be secured in a tightened position by any suitable feature such as, for example, a snap. Moreover, one or more portions of strap 204 may be coupled to support bracket 202 by any suitable means. In alternative embodiments, receiving portion 208 may include retaining features (e.g., tabs, clips, etc.) configured to retain frame 50 therein without the need for strap 204.

Figure 5B:
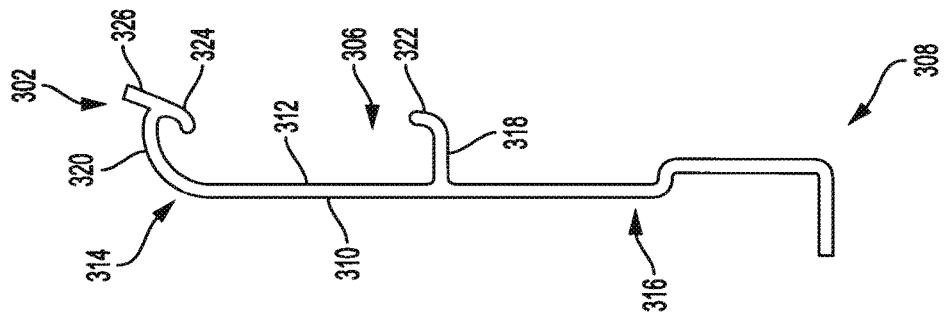
FIG. 5b is a side view of the support bracket shown in FIG. 5a, in accordance with the principles of the present disclosure.
Figure 5A:
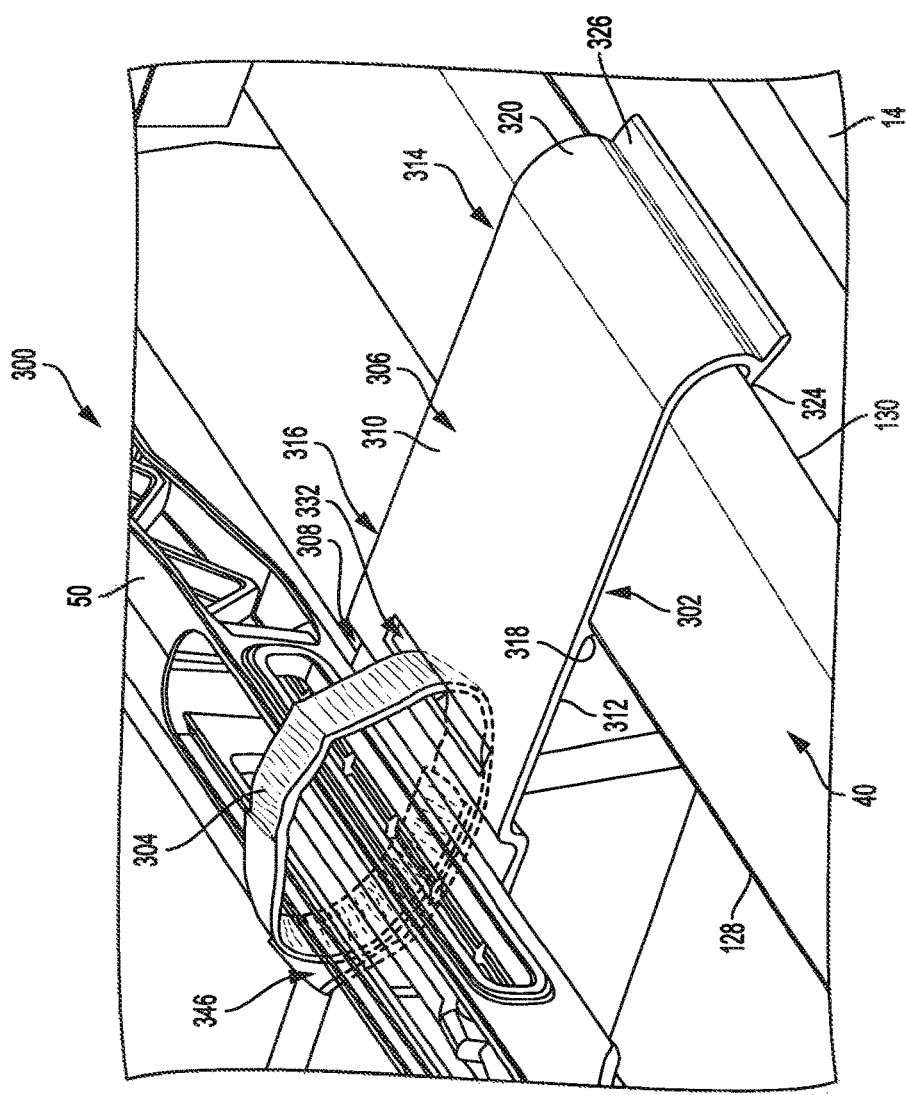
FIG. 5a is a perspective view of another example support bracket configured to support the soft top assembly in the position shown in FIG. 3, in accordance with the principles of the present disclosure.

With further reference to FIGS. 5a and 5b, support bracket assembly 300 will be described in more detail. In the example embodiment, each support bracket assembly 300 generally includes a support bracket 302 and a strap 304. In general, one support bracket 302 is secured to the opposed rear rails 40 disposed on either side of the rear of the vehicle. Thus, each support bracket 302 receives one side of the collapsed articulating frame 50 (e.g., front/rear side rails 84, 86), and straps 304 are utilized to subsequently secure frame 50 to the support brackets 302 to facilitate preventing relative movement between frame 50 and the vehicle body 14.

In the illustrated example, support bracket 302 generally includes a main body portion 306 and a receiving portion 308 extending therefrom. Main body portion 306 includes an upper face 310, a lower face 312, a first end 314, and an opposite second end 316. Lower face 312 includes an inner connecting tab or clip 318 extending outwardly therefrom, and first end 314 includes an outer connecting tab or clip 320. In this way, inner and outer clips 318, 320 may be clipped around the rear rail 40. More specifically, inner clip 318 includes a hooked distal portion 322 configured to wrap around and engage an inner edge 128 of rear rail 40, and outer clip 320 includes a hooked distal portion 324 configured to wrap around and engage an outer edge 130 of rear rail 40. Additionally, outer clip 320 may include a removal tab 326 configured to facilitate removal of the support bracket 302 rear rail 40. Main body portion second end 316 includes an aperture or slot 332 formed therein configured to receive strap 304 therethrough.

Support bracket receiving portion 308 is generally U-shaped and includes a supporting wall 340 extending between a first side wall 342 and a second side wall 344. First side wall 342 is coupled to main body portion 306 and opposite second side wall 344 is a free end. Supporting wall 340 provides a supporting surface for the articulating frame 50 in the stowed position (FIG. 3) and side walls 342, 344 are disposed on either side of the received articulating frame 50. In this way, supporting wall 340 facilitates preventing downward movement of frame 50, and side walls 342, 344 facilitate preventing transverse cross-car movement of frame 50.

Moreover, strap 304 is inserted through slot 332, wrapped around frame 50 and receiving portion 308, and tightened to further secure frame 50 within receiving portion 308. This facilitates preventing upward movement of frame 50 as well as fore/aft movement of frame 50. In the example embodiment, strap 304 includes a hook and pile fastener portion 346 such that strap 304 can be attached to itself after being inserted through slot 332 and tightened around frame 50 and receiving portion 308. However, it will be appreciated that strap 304 may be secured in a tightened position by any suitable feature such as, for example, a snap. Moreover, one or more portions of strap 304 may be coupled to support bracket 302 by any suitable means. In alternative embodiments, receiving portion 308 may include retaining features (e.g., tabs, clips, etc.) configured to retain frame 50 therein without the need for strap 304.

With further reference to FIGS. 6a and 6b, support bracket assembly 400 will be described in more detail. In the example embodiment, each support bracket assembly 400 generally includes a support bracket 402 and a strap 404. In general, one support bracket 402 is secured to the opposed door rails 42 disposed on either side of the rear of the vehicle. Thus, each support bracket 402 receives one side of the collapsed articulating frame 50 (e.g., front/rear side rails 84, 86), and straps 404 are utilized to subsequently secure frame 50 to the support brackets 402 to facilitate preventing relative movement between frame 50 and the vehicle body 14.

In the illustrated example, support bracket 402 generally includes a main body portion 406 and a receiving portion 408 extending therefrom. Main body portion 406 includes an upper face 410, a lower face 412, a first end 414, and an opposite second end 416. Main body portion first end 414 includes an aperture or slot 422 formed therein configured to receive strap 404 therethrough, and a hinge 424 configured to couple to an upper inner surface 132 of the door rail 42 (see FIG. 6a). In this way, support bracket 402 is hingedly coupled to door rail 42 and is configured to rotate between a support position (shown in solid in FIG. 6a) and retracted position (shown in phantom in FIG. 6a). As such, support bracket 402 can be moved to the retracted position when the articulated frame 50 is in the deployed position, and subsequently moved to the support position when the frame 50 is moved to the stowed position for supporting portions of the frame 50.

Support bracket receiving portion 408 is generally U-shaped and includes a supporting wall 430 extending between a first side wall 432 and a second side wall 434. First side wall 432 is coupled to main body portion 406 and opposite second side wall 434 is a free end. Supporting wall 430 provides a supporting surface for the articulating frame 50 in the stowed position (FIG. 3) and side walls 432, 434 are disposed on either side of the received articulating frame 50. In this way, supporting wall 430 facilitates preventing downward movement of frame 50, and side walls 432, 434 facilitate preventing transverse cross-car movement.

Moreover, strap 404 is inserted through slot 422, wrapped around frame 50 and receiving portion 408, and tightened to further secure frame 50 within receiving portion 408. This facilitates preventing upward movement of frame 50 as well as fore/aft movement of frame 50. In the example embodiment, strap 404 includes a hook and pile fastener portion 436 such that strap 404 can be attached to itself after being inserted through slot 422 and tightened around frame 50 and receiving portion 408. However, it will be appreciated that strap 404 may be secured in a tightened position by any suitable feature such as, for example, a snap. Moreover, one or more portions of strap 404 may be coupled to support bracket 402 by any suitable means. In alternative embodiments, receiving portion 408 may include retaining features (e.g., tabs, clips, etc.) configured to retain frame 50 therein without the need for strap 404.

Described herein are systems and methods for securing portions of a vehicle soft top assembly in a stowed position. The systems include a support bracket assembly coupled to either side of a rear portion of the vehicle. Each support bracket assembly includes a support bracket coupled to the vehicle rear portion and configured to supportably receive a portion of the soft top assembly. A strap extends through the support bracket and is wrapped around the support bracket and soft top assembly to secure the soft top assembly to the support bracket. In this way, the support bracket assembly supports and holds the soft top assembly in place and facilitates preventing movement of the soft top assembly relative to the vehicle that could cause damage to surrounding vehicle components.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A support bracket assembly configured to couple to a vehicle body and support a collapsed articulating frame of a vehicle soft top assembly, the support bracket assembly comprising:
a support bracket having a main body portion having a slot formed therein and configured to couple to the vehicle body, and a receiving portion coupled to the main body portion and configured to receive at least a portion of the collapsed articulating frame therein; and
a strap configured to be inserted through the slot and wrapped around the collapsed articulating frame to facilitate securing the collapsed articulating frame within the receiving portion and preventing relative movement of the collapsed articulating frame when the vehicle is in motion.

2. The support bracket assembly of claim 1, wherein the main body portion includes a hinge configured to couple to the vehicle body such that the support bracket is movable between a retracted position disengaged from the articulating frame and a deployed support position configured to support the articulating frame.

3. The support bracket assembly of claim 1, wherein the strap includes a hook and pile fastener such that the strap is configured to wrap around the collapsed articulating frame and couple to itself.

4. The support bracket assembly of claim 1, wherein the receiving portion includes a supporting wall coupled between opposed side walls.

5. The support bracket assembly of claim 4, wherein the receiving portion is U-shaped.

6. The support bracket assembly of claim 4, wherein one of the opposed sidewalls is coupled to the main body portion.

7. The support bracket assembly of claim 1, wherein the main body portion further includes an aperture formed therethrough, the aperture configured to receive a fastener to couple the main body portion to the vehicle body.

8. The support bracket assembly of claim 7, wherein the main body portion further includes an alignment flange extending from a lower face of the main body portion, the alignment flange configured to be disposed against the vehicle body.

9. The support bracket assembly of claim 1, wherein the main body portion includes opposed clips extending therefrom, the opposed clips configured to clip to the vehicle body.

10. A vehicle comprising:
a vehicle body including opposed rear side panels having an upper surface;
a soft top assembly coupled to the vehicle body, the soft top assembly including an articulating frame movable between a deployed position and a collapsed stowed position; and
a pair of support bracket assemblies coupled to the opposed rear side panel upper surfaces and configured to support the articulating frame in the collapsed position, each support bracket assembly including:
a support bracket having a main body portion having a slot formed therein and configured to couple to one rear side panel, and a receiving portion coupled to the main body portion and configured to receive at least a portion of the collapsed articulating frame therein; and
a strap configured to be inserted through the slot and wrapped around the collapsed articulating frame to facilitate securing the collapsed articulating frame within the receiving portion and preventing relative movement of the collapsed articulating frame when the vehicle is in motion.

11. The vehicle of claim 10, further comprising a rear rail coupled between the rear side panel upper surface and the support bracket.

12. The vehicle of claim 10, wherein the receiving portion is U-shaped and includes a supporting wall coupled between opposed side walls.

13. The vehicle of claim 12, wherein one of the opposed sidewalls is coupled to the main body portion.

14. The vehicle of claim 10, wherein the support bracket extends along a longitudinal axis, wherein the longitudinal axis extends along a cross-car axis; and wherein the main body portion further includes an aperture formed therethrough, the aperture configured to receive a fastener to couple the main body portion to the vehicle body.

15. The vehicle of claim 14, wherein the main body portion further includes an alignment flange extending from a lower face of the main body portion, the alignment flange configured to be disposed against the vehicle body.

16. The vehicle of claim 10, wherein the main body portion includes opposed clips extending therefrom, the opposed clips configured to clip to the vehicle body.

17. The vehicle of claim 10, wherein the main body portion includes a hinge configured to couple to the vehicle body such that the support bracket is movable between a retracted position and a deployed support position configured to support the articulating frame; and wherein the articulating frame is not disposed in the receiving portion when the articulating frame is not in the collapsed position.

18. The vehicle of claim 17, further comprising a door rail coupled between the rear side panel upper surface and the hinge.

* * * * *